United States Patent [19]

Wirth

[11] 3,736,777

[45] June 5, 1973

[54] LOCKING ATTACHING MECHANISM FOR DISK-PACK STORAGE CONTAINER

[75] Inventor: Wayne M. Wirth, North Saint Paul, Minn.

[73] Assignee: Minnesota Mining and Manufacturing Company, St. Paul, Minn.

[22] Filed: Nov. 1, 1971

[21] Appl. No.: 194,150

[52] U.S. Cl. ....................................70/63, 206/52 F

[51] Int. Cl. ..............................................E05b 65/52

[58] Field of Search.................206/52 A, 52 R, 52 F, 206/46 FM, 59 E, 62 R, 62 P; 220/55 R, 55 A, 55 C, 55 Z; 292/254; 312/20; 70/14, 58, 63, 169, 172

[56] References Cited

UNITED STATES PATENTS

| | | | |
|---|---|---|---|
| 3,504,652 | 4/1970 | Norman | 206/52 F X |
| 3,700,098 | 10/1972 | Posso | 206/52 F |
| 3,582,169 | 6/1971 | Koenig | 312/20 |

*Primary Examiner*—Robert L. Wolfe
*Attorney*—Kinney, Alexander, Sell, Steldt & Delahunt

[57] ABSTRACT

A mechanism for releasably attaching the bottom cover of a disk-pack storage container to a disk pack, including a key-operated cylinder lock which may be operated to lock the mechanism in the attached position.

5 Claims, 5 Drawing Figures

INVENTOR
WAYNE M. WIRTH
BY Kinney, Alexander, Sell, Steldt & DeLaHunt.
ATTORNEYS

LOCKING ATTACHING MECHANISM FOR DISK-PACK STORAGE CONTAINER

BACKGROUND OF THE INVENTION

This invention relates to an improvement in the mechanism for closing a disk-pack storage container, and in one aspect to an improvement in the mechanism for releasably attaching the bottom cover of a disk-pack storage container to a disk pack.

Storage containers for computer disk packs generally comprise a top cover having a circular top wall and a dependent cylindrical side wall which surrounds a disk pack attached therein; and a mating circular bottom cover coupled to the disk pack by a releasable attaching mechanism. To use the disk pack on a computer disk drive, the attaching mechanism is operated to detach and remove the bottom cover. The top cover then serves as a wrench to rotate a bolt assembly on the disk pack to couple the disk pack to the spindle of the disk drive; whereupon the mechanism attaching the disk pack to the top cover is automatically released by interaction with the disk drive as is more completely described in U.S. Pat. No. 3,465,875.

The prior art is replete with mechanisms for releasably attaching the bottom cover of a disk-pack storage container to a disk pack. The prior art attaching mechanisms, however, do not provide means for restricting access to a disk pack housed in a disk-pack storage container. Such restricted access is often required, such as when a disk pack is transported between computer locations, to prevent unauthorized access to important data recorded on the disk pack. This requirement in some cases has resulted in shipping the disk pack in a storage container enclosed in a separate locked housing. Restricted access to certain disk-pack storage containers is also desirable in a computer storage center to prevent inadvertent or unauthorized usage of a particular disk pack, or to aid in the identification of disk packs belonging to a particular user.

SUMMARY OF THE INVENTION

A disk-pack storage container having a bottom cover attaching mechanism constructed according to the present invention affords key-operated locking of the disk-pack storage container to restrict access of unauthorized individuals to the disk pack contained therein.

According to the present invention there is provided a mechanism for releasably attaching the bottom cover of a disk-pack storage container to a disk pack comprising a manually engageable movable member mounted on the bottom cover for movement between a first and a second position, and a latching means adapted for engagement with a disk pack and mounted for movement relative to the bottom cover between a latch position for engaging a disk pack and a release position out of engagement with the disk pack. The closure mechanism also includes means affording relative movement between the latching means and the movable member to move the latching means to the latch position upon movement of the movable member to its first position, and to afford movement of the latching means to the release position upon movement of the movable member to the second position; and a lock means comprising a pin tumbler lock mechanism having a key-operated plug mounted for rotation relative to the movable member between an unlocked position and a locked position for locking the movable member in the first position. Arm means is attached to the plug and rotatable therewith upon movement of the plug to the locked position for blocking movement of the movable member from its first position.

BRIEF DESCRIPTION OF THE DRAWING

The invention will be further described with reference to the accompanying drawings wherein like numbers refer to like parts in the several views, and wherein.

DESCRIPTION OF THE PREFERRED EMBODIMENT

Figure 1:
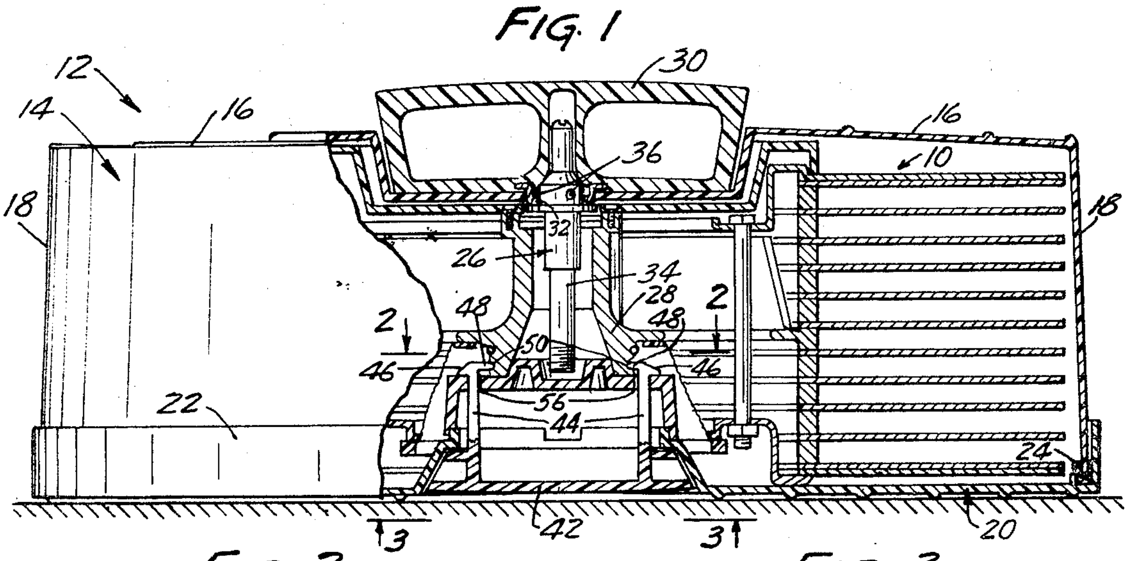
FIG. 1 is a vertical view partially in section of a disk-pack storage container having a disk pack therein and having a mechanism according to the present invention for releasably attaching the bottom cover of the storage container to the disk pack.

Referring now to FIG. 1, there is shown a disk-pack storage container 12 housing a disk pack 10 and having a bottom cover attaching mechanism according to the present invention. The disk-pack storage container 12 comprises a top cover 14 having a circular top wall 16 and a dependent cylindrical side wall 18. The storage container 12 also includes a circular bottom cover 20 with an upwardly extending annular lip 22 to guide the open end of the side wall 18 into engagement with a circular gasket 24 mounted in the bottom cover 20 to afford a dust-tight seal between the engaged top and bottom covers 14 and 20.

The disk-pack container 12 includes closure means for coupling the top and bottom covers 14 and 20 to the disk pack 10 to maintain a seal between the covers 14 and 20. The closure means includes a mechanism for releasably attaching the top cover 14 to a mounting bolt assembly 26 in a hub 28 of the disk pack 10, which attaching mechanism is releasable only after removal of the bottom cover 20 from the storage container 12.

A handle 30 for the disk-pack storage container 12 is mounted in a depression in the top cover 14 and is formed with a socket 32 designed to mate with an upper portion of the bolt assembly 26. The bolt assembly 26 includes a bolt body 34 and a series of balls 36 guided for radial movement within orifices formed in the bolt body 34. The balls 36 are movable outwardly in the orifices to engage receiving notches in the socket 32 by an axially slidable cam within the bolt assembly (not shown) normally biased to a position locating the balls 36 outwardly in the orifices to maintain locking engagement with the socket 32. The disk drive unit (not shown) for use with the disk pack includes a pin for engaging and moving the cam within the bolt body 34, thereby affording movement of the balls 36 inwardly of the bolt body 34 to release the top cover 12 upon coupling of the disk pack 10 to the disk drive.

The bottom cover attaching mechanism, according to the present invention, includes means for releasably attaching the bottom cover 20 to the disk pack 10, and lock means including a key-operated pin tumbler lock mechanism 40 to afford locking of the disk-pack container 12.

Referring now to FIGS. 1 through 5, the means for releasably attaching the bottom cover 20 to the disk pack 10 includes a circular movable or rotatable member 42 journaled for rotation in a central opening through the bottom cover 20. The rotatable member 42 is formed with a handle 43 manually engageable from the exterior of the closed storage container 12 to operate the means for releasably attaching the bottom cover 20 to the disk pack 10.

Formed on the rotatable member 42 is latching means movable between a latch position for engaging the disk pack 10 and a release position for affording removal of the bottom cover 20. The latching means comprises a pair of cantilevered flexible, resilient members 44, each carrying at its distal end a head or latch member 46 having a lip 48 adapted for engagement with an annular groove 50 formed around the base of the disk pack hub 28. The resilient members 44 are formed to normally space the lips 48 of the latch members 46 in a release position to afford positioning the hub 28 therebetween without engagement of the lips 48 with the annular groove 50; however, the resilient members 44 may be deflected toward each other by means serving the function of a cam, and hereinafter referred to as cam means, upon rotation of the rotatable member 42, thereby moving the latch members 46 radially of the axis of the rotatable member 42 to a latch position at which the lips 48 will engage the annular groove 50 on the disk pack hub 28.

The cam means affords relative movement between the latch members 46 and the rotatable member 42 to move the latch members 46 to the latch position upon rotation of the rotatable member 42 to a closed or first position and affords movement of the latch members 46 to the release position upon rotation of the rotatable member 42 to an open or second position.

Figure 2:
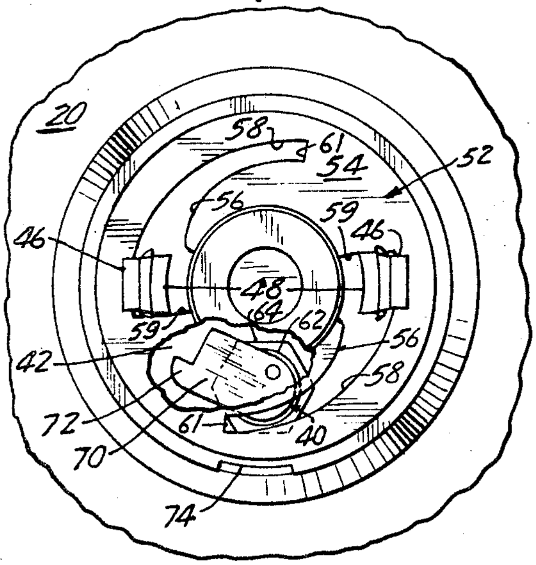
FIG. 2 is an enlarged fragmentary view partially in section taken approximately along lines 2—2 of FIG. 1, with the disk pack removed to show the bottom cover attaching mechanism according to the present invention.
Figure 3:
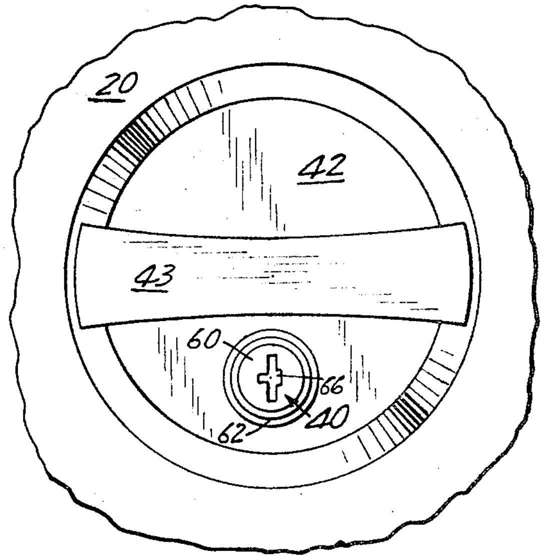
FIG. 3 is an enlarged fragmentary view taken approximately along lines 3—3 of FIG. 1.

A cam member 52 is fixed on the bottom cover 20 concentric with the rotatable member 42. The cam member 52 has a planar wall 54 formed with a pair of arcuate slots 56, each slot 56 having an outer edge 58 which serves the purpose of a cam and is hereinafter referred to as a cam surface 52. Each resilient member 44 projects through a slot 56 and engages the cam surface 58 adjacent its latch member 46. The adjacent surfaces of the outboard ends of the latch members 46 and the wall 54 are in sliding contact to retain the rotatable member 42 within the bottom cover 20. Each cam surface 58 is formed with a decreasing radius about the axis of rotation of the rotatable member 42 from an end 61 to an end 59 of the slot 56 to afford positioning of the latch members 46 in the release position under the influence of the resilient members 44 at the second position of the rotatable member 42 defined by the ends 61 of the slots 56; and to deflect the resilient members 44 toward each other radially of the rotatable member 42 to move the latch members 46 to the latch position upon rotation of the rotatable member 42 approximately 90° from the second to the first position defined by the ends 59 of the slots 56 (FIG. 2).

The lock means of the bottom cover attaching mechanism is seen in FIGS. 2 through 5. The lock means includes the lock mechanism 40 which, when the rotatable member 42 is in the first or closed position, may be operated to position an arm means to block rotation of the rotatable member 42 to the second or open position.

The pin tumbler lock mechanism 40 includes a conventional key-operated rotatable plug 60 and a flanged generally cylindrical lock housing 62 mounted axially parallel to the rotatable member 42, through a flatted orifice therein by a jam nut 64 threadably engaging the periphery of the lock housing 62. The lock mechanism 40 is positioned to afford engagement of a key (not shown) through a keyway 66 in the plug 60 accessible adjacent the handle 43. The plug 60 is rotatable approximately 90° between a locked position affording conventional locking engagement of pin tumblers between the plug 60 and the lock housing when the key is removed; and an unlocked position defined by engagement of a pin 68 on a lock arm 70 attached to the plug 60 with the end of a groove 69 formed in the lock housing 62.

Figure 4:
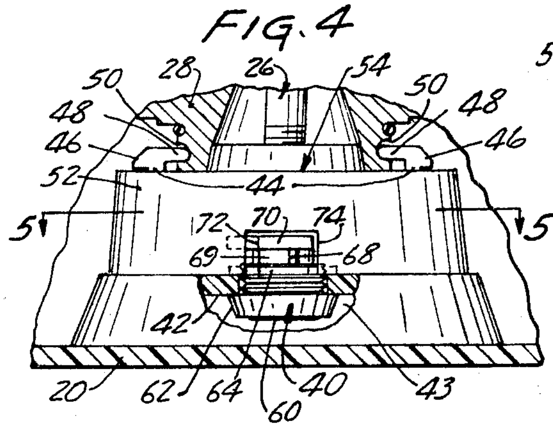
FIG. 4 is an enlarged fragmentary vertical view partially in section of the bottom cover closure mechanism of FIG. 1.
Figure 5:
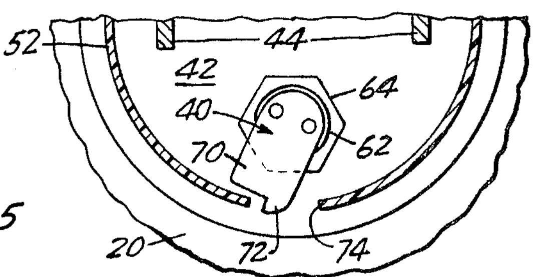
FIG. 5 is a fragmentary sectional view taken approximately along lines 5—5 of FIG. 4.

When the rotatable member 42 is in its first or closed position, the plug 60 may be rotated to its locked position to place a projection 72 on the lock arm 70 within a slot 74 formed through the wall of the cam member 52 as shown in FIGS. 4 and 5. In this position slight rotation of the rotatable member 42 will engage the projection 72 with the edge of the slot 74, thereby blocking rotation of the rotatable member 42 to the first or open position. The attaching mechanism may then be unlocked by inserting the key in the keyway 66 to release the pins and rotating the plug 60 to its unlocked position corresponding to the unlocked position of the plug 60 (shown in FIG. 2) to remove the projection 72 on the lock arm 70 from the slot 74 so that the rotatable member 42 may be rotated to its open position.

Operation of the bottom cover attaching mechanism will now be explained to attach the bottom cover 20 to the hub 28 of a disk pack 10. With the rotatable member 42 rotated to its second or open position affording positioning of the disk pack hub 28 between the widely spaced members 46, the bottom cover 20 is moved into contact with the open end of the top cover 14, placing the hub 28 of the disk pack 10 generally in contact with the wall 54. The rotatable member 42 is manually rotated via the handle 40 from its second or open position to its first or closed position defined by the slots 56 in the cam member 52, thereby moving the resilient members 44 along the cam surfaces 58 to move the latch members 44 into latching engagement with the annular groove 50 formed about the periphery of the disk pack hub 28. With the rotatable member 42 in the first position, the lock mechanism 40 may be retained in the unlocked position to afford free rotation of the rotatable member 42 to again remove the bottom cover 20 from the disk-pack container. Alternatively, the plug 60 may be rotated by the appropriate key to move the lock arm 70 to a lock position at which the projection 72 will engage the slot 74 in the wall of the cam member 52, thereby preventing rotation of the rotatable member 42 to its open position to remove the bottom cover 20. Removal of the key will then afford restricted access by unauthorized individuals to the disk pack 10 within the storage container 12.

Having thus described the present invention, what is claimed is:

1. A mechanism for attaching the bottom cover of a disk-pack storage container to a disk pack, comprising:

a manually engageable movable member mounted on said bottom cover for movement between a first and a second position;

latching means adapted for engagement with a said disk pack and mounted for movement relative to said bottom cover between a latch position for engaging a said disk pack and a release position out of engagement with a said disk pack;

means for affording relative movement between said latching means and said movable member to move said latching means to said latch position upon movement of said movable member to said first position and to move said latching means to said release position upon movement of said movable member to said second position; and lock means comprising:

a pin tumbler lock mechanism including a key-operated plug mounted for rotation relative to said movable member between a locked and an unlocked position; and arm means coupled to said plug and actuable thereby by movement of said plug to the locked position when said movable member is in said first position to block movement of said movable member from said first to said second position.

2. The mechanism of claim 1 wherein said movable member is rotatably mounted on said bottom cover for movement between said first and said second position, said lock mechanism is mounted on said rotatable member, and said arm means comprises an arm attached to said plug and engageable with a notch formed in said bottom cover to block rotation of said rotatable member from said first position upon movement of said lock cylinder to said locked position.

3. The mechanism of claim 1 wherein said movable member is rotatably mounted on said bottom cover for movement between said first and said second position, said latching means comprises latch members mounted for radial movement on said movable member between said latch position and said release position; and said disk pack includes a hub formed with an annular groove, said latch member being adapted to engage said annular groove to couple said bottom cover to said hub when said movable member is rotated to said first position.

4. The mechanism of claim 3 wherein said means for affording relative movement between said latch means and said movable member comprises spaced cantilevered flexible, resilient members mounted at one end on said movable member and carrying said latch members at the other end thereof; and cam means fixably mounted on said bottom cover and comprising cam surfaces engageable with said resilient members to deflect said resilient members to move said latch members radially of said rotatable member from said release to said latch position upon rotation of said movable member from said second to said first position.

5. The mechanism of claim 4 wherein said plug is mounted on said rotatable member axially parallel with said movable member, and said arm means comprises an arm attached to said plug and engageable with said bottom cover to block rotation of said rotatable member from said first to said second position upon rotation of said lock cylinder to said locked position.

* * * * *